US008020601B2

(12) United States Patent
Eder et al.

(10) Patent No.: US 8,020,601 B2

(45) Date of Patent: Sep. 20, 2011

(54) MACHINE FOR EQUIPPING ARTICLES WITH LABELS

(75) Inventors: Erich Eder, Donaustauf (DE); Thomas Oestreicher, Muhlhausen (DE); Dieter Leykamm, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 11/029,795

(22) Filed: Jan. 5, 2005

(65) Prior Publication Data

US 2005/0153427 A1 Jul. 14, 2005

(30) Foreign Application Priority Data

Jan. 19, 2004 (DE) ......................... 10 2004 002 800
Nov. 5, 2004 (DE) ......................... 10 2004 054 057

(51) Int. Cl.
*B32B 15/00* (2006.01)

(52) U.S. Cl. ......................... 156/556; 156/566; 156/567

(58) Field of Classification Search .................. 156/556, 156/566, 567
See application file for complete search history.

(56) References Cited

U.S. PATENT DOCUMENTS

| | | | | |
|---|---|---|---|---|
| 3,876,258 | A * | 4/1975 | Abderhalden | 406/79 |
| 3,926,083 | A * | 12/1975 | Janiszewski | 83/637 |
| 4,165,138 | A * | 8/1979 | Hedge et al. | 242/560 |
| 4,279,687 | A | 7/1981 | Buchholz et al. | |
| 4,336,098 | A | 6/1982 | Zodrow | |
| 4,362,594 | A * | 12/1982 | Nagano et al. | 156/567 |
| 4,369,214 | A | 1/1983 | Pfülb et al. | |
| 4,450,040 | A * | 5/1984 | Zodrow et al. | 156/567 |
| 4,479,839 | A * | 10/1984 | Tasma | 156/249 |
| 5,141,572 | A * | 8/1992 | Gerber | 156/64 |
| 5,624,525 | A * | 4/1997 | Ehara et al. | 156/360 |
| 5,983,970 | A * | 11/1999 | Trygg | 156/566 |
| 6,474,390 | B1 * | 11/2002 | Vandevoorde | 156/494 |
| 6,672,356 | B1 | 1/2004 | Jenkins et al. | |

FOREIGN PATENT DOCUMENTS

| | | | |
|---|---|---|---|
| DE | 19741476 | | 3/1999 |
| DE | 19741476 | A1 | 3/1999 |
| DE | 20214280 | U1 * | 12/2002 |
| DE | 203 05 967 | | 8/2003 |
| EP | 1167213 | A1 | 1/2002 |
| JP | 59-133414 | | 9/1984 |
| JP | 02-243225 | | 9/1990 |
| WO | WO-03/024861 | | 3/2003 |

OTHER PUBLICATIONS

Jagenberg, Bottle Labellers SOLAR with rotating glue segments, Solar 30, Solar 38, Solar 50, Solar 70.

English translation of Notice of Reasons for Rejection issued by the Japanese Patent Office in the counterpart Japanese patent application No. 2006-548215 on Jan. 5, 2010.

Jagenberg, Bottle Labellers SOLAR with rotating glue segments, Solar 30, Solar 38, Solar 50, Solar 70, Feb. 9, 2007.

* cited by examiner

*Primary Examiner* — Kimberly K McClelland

(74) *Attorney, Agent, or Firm* — Marshall, Gerstein & Borun LLP

(57) ABSTRACT

A machine for equipping articles with labels, such as vessels or similar items, including at least one carousel which transports the articles, at least one exchangeable labeling aggregate which is arranged on the periphery of the carousel for equipping the articles, where, on the periphery of the carousel, at least one stationary floor-supported aggregate reception for a labeling aggregate is arranged.

25 Claims, 8 Drawing Sheets

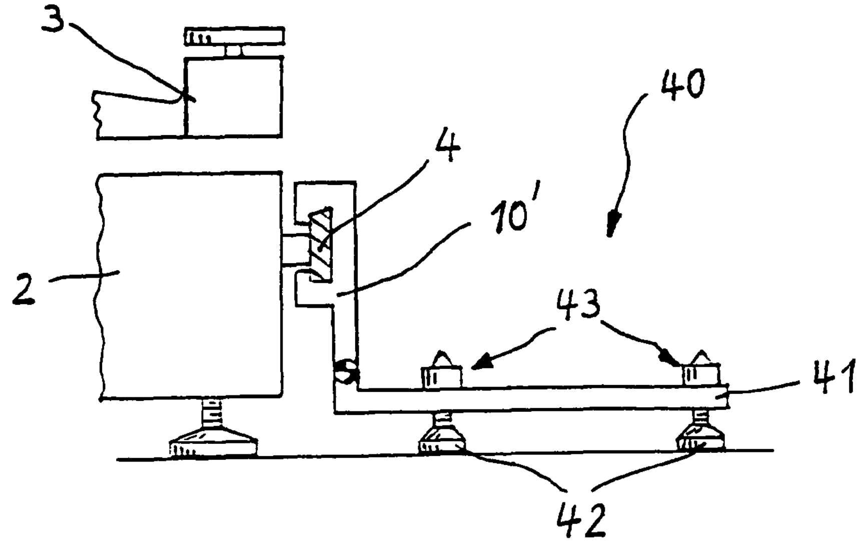
Fig. 8
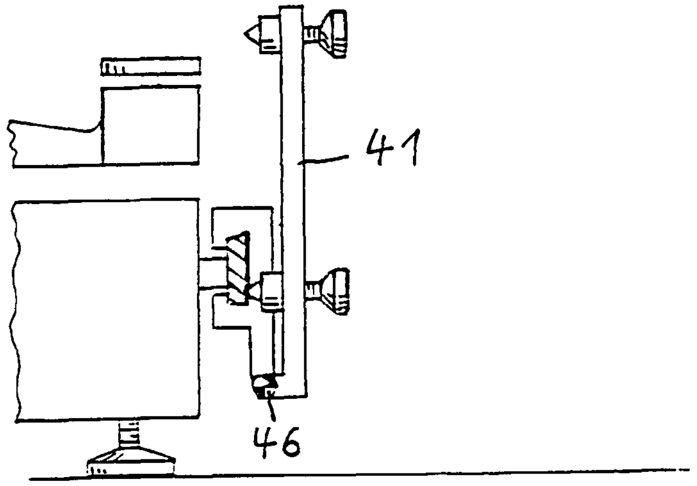
Fig. 9
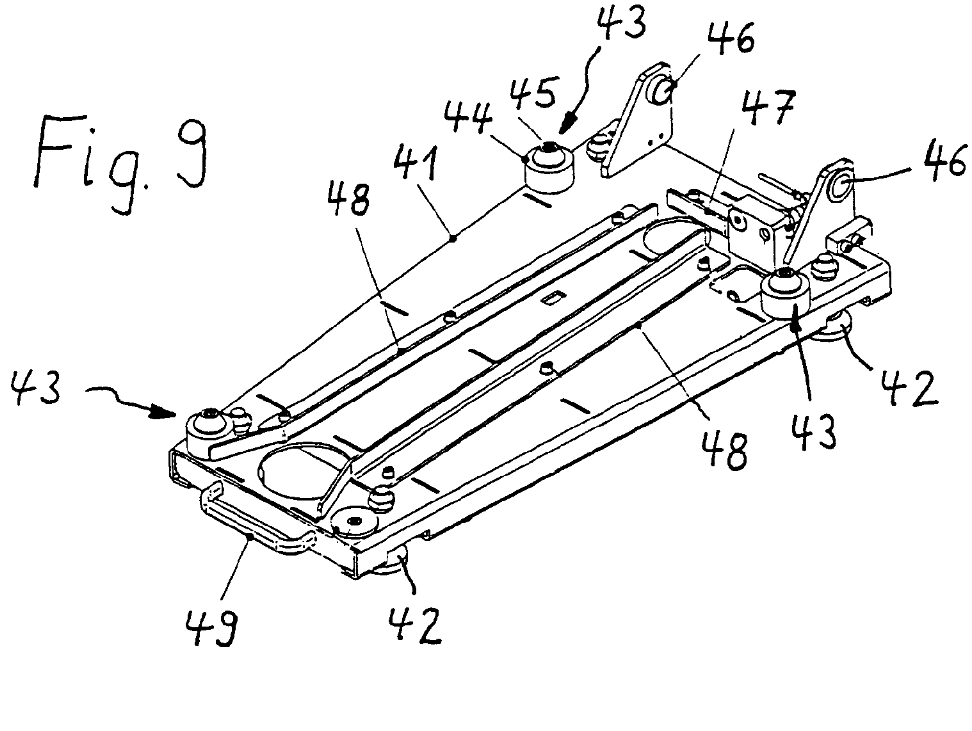

MACHINE FOR EQUIPPING ARTICLES WITH LABELS

FIELD OF THE DISCLOSURE

This disclosure relates to a machine for equipping articles.

BACKGROUND OF THE DISCLOSURE

Machines are known from DE 197 41 476 A1 for equipping articles of different design. FIG. 1 of this document shows a labeling machine with a table plate, to which a continuously drivable carousel is attached for leading articles to be equipped past labeling aggregates. This table plate, in addition, supports the mentioned labeling aggregates. With this construction, it is time consuming and difficult to exchange labeling aggregates. Moreover, such labeling machines occupy a relatively large space, because of the large table plate.

FIG. 4 of the same document discloses an embodiment example, in which the labeling aggregates are designed as freestanding, exchangeable modules with their own support and an associated drive. To establish the position of the labeling aggregates with respect to the carousel of the machine, the labeling aggregates have to be fixed. For this purpose, the labeling aggregates are screwed to the floor of the hall, for example. In comparison to the first mentioned embodiment, this solution already allows an improved handling of the labeling aggregate during aggregate replacement. Nevertheless, this embodiment also requires considerable effort for the orientation and fixing of the labeling aggregates, which has a negative financial impact, in particular in the case of frequent aggregate replacement, due to the times required for the resetting.

SUMMARY OF THE DISCLOSURE

In contrast, the invention is based on the problem of providing an improved solution which allows easier and more rapid handling of labeling aggregates during resetting work.

As a result of the floor-supported aggregate reception, of which at least one is provided in a stationary position on the periphery of the carousel, a more rapid and nevertheless more precise replacement of any labeling aggregate is possible. The aggregate reception, at the time when the machine is set up, is oriented once and for all in an exact position relative to the carousel or the transport plane of the article to be equipped. It is particularly advantageous to use a subsequent fixed anchoring of the aggregate reception on the floor of the hall.

Depending on the conditions of the site of installation, this aggregate reception can be made to order. An adjustable construction is particularly advantageous, which allows one to set the orientation of the aggregate reception relative to the carousel as continuously as possible with respect to the required height and/or the radial separation and/or the slope of the transport plane.

On the exchanged labeling aggregates, which can be designed for processing different label types, such as, for example, self adhesive labels, cold glue labels or rolled labels, there are, in each case, first elements, which, at the time of the insertion of a labeling aggregate into the aggregate reception, engage with corresponding second elements in the aggregate reception, where during the introduction or insertion of the labeling aggregate, the collaboration between the first and second elements leads to a centering and fixing of the position of the labeling aggregate. The mentioned first and second elements, can be designed in the form of abutment bodies, which are preferably adjustable and which delimit the pushing in or insertion movement of the labeling apparatus in the desired final position.

It is advantageous to use a complementary design of the first and second elements which are associated with the labeling aggregate and the aggregate reception, in particular using a positive-lock design so that, when the elements are assembled until the final position is achieved, an automatic orientation of a labeling aggregate with respect to the aggregate reception occurs. For this purpose, it is particularly advantageous to use centering cones, which engage, with positive lock, into appropriately adjusted centering bores. As a result of such a self-centering, it is possible, without problem, to replace a label aggregate without using a tool. If the mentioned first and second elements are appropriately arranged, for example, with perpendicular direction of force, the labeling aggregate always remains centered due to its own weight only, in the desired orientation position with respect to the carousel of the equipping machine.

For a precise and permanent maintenance of the relative position of aggregate reception and carousel for achieving the labeling result, it is advantageous to provide a connection between the aggregate reception and the frame which carries the carousel or components attached to the latter frame.

It is particularly advantageous to use an aggregate reception, because it allows a change in the gluing height of labels on articles to be equipped. For this purpose, the labeling aggregates which have been used to date all present a relatively expensive device for height adjustment, which can now be omitted. Because an equipping machine of the design in question can have considerably more labeling aggregates than aggregate reception places on the periphery of the carousel, the construction expenses resulting from this advantageous embodiment are considerable. The device for height adjustment is preferably provided with motor driven actuation, for example, an electromotor.

For a quick resetting to different label adhesion heights, one can provide preadjustable abutment bodies, which are located in the travel path of the label aggregate. In the case of a motor-driven actuation, one can use, instead of abutment bodies, end switches whose positions can be changed. It is particularly advantageous to query the height adjustment of the aggregate reception, for example, via a speed sensor on the electrical drive motor, because in that case an automated switching off of the drive can occur, in connection with a control, once each given position associated with a certain label adhesion height, has been reached. Together with a control which can be stored in memory, it is advantageous to store in memory several position values which are associated with different label adhesion heights, which position values can be called by pressing a button during the resetting of the equipping machine.

BRIEF DESCRIPTION OF THE DRAWINGS

Below, preferred embodiment examples are explained with reference to the figures. In the drawing:

FIG. 8 is a schematic side view of a first embodiment of an aggregate reception for a labeling aggregate in two different settings, and FIG. 9 is a perspective partial representation of the embodiment according to FIG. 8.

DETAILED DESCRIPTION

Figure 1:
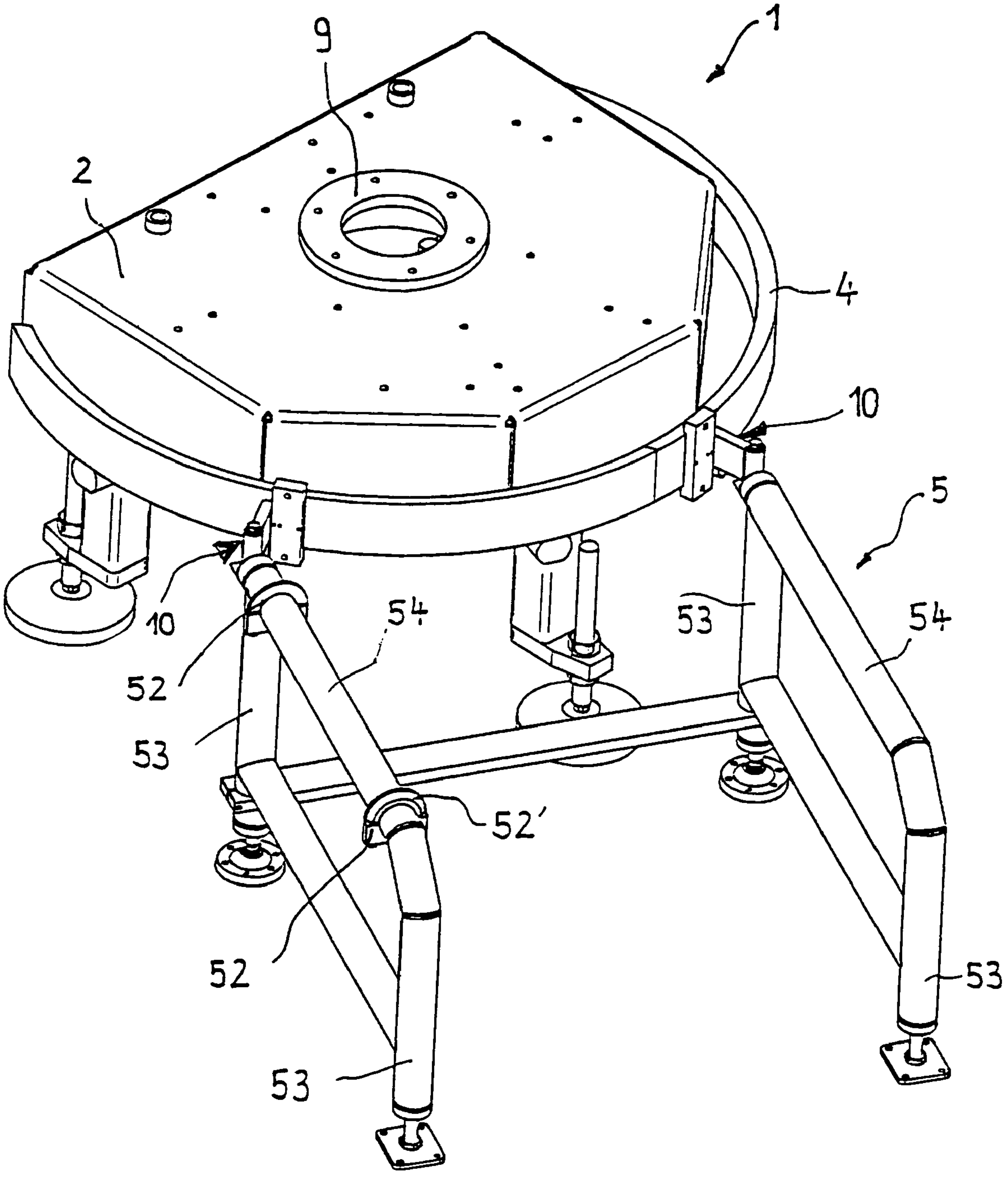
FIG. 1 shows a perspective representation of a first embodiment of an aggregate reception for a labeling aggregate.

From FIG. 1, a part of a labeling machine in frame construction without a labeling aggregate is shown in a perspective view. For a better overview, the carousel which continuously transports the article to be labeled (see FIG. 6) is not depicted. The machine 1 consists substantially of a frame 2 with a rotating bearing 9 for the carousel, which is arranged approximately in the middle of the frame. A ring 4, which covers the periphery at least in part, is rigidly fixed to the frame 2, at a radial separation with respect to the rotating bearing and concentrically with respect to the latter. On the ring 4, a stationary aggregate reception 5 is attached with connection elements 10, to allow rapid replacement of a labeling aggregate 8 (FIG. 2).

The aggregate reception 5 is a bar-like pipe construction which is open toward the radially external side, which presents four vertical support legs 53 (which can be attached to the floor) at the corners of an imaginary rectangle, and whose height can be adjusted, with two horizontal parallel support rods 54, which have a circular cross section, and which are located on the upper ends of the support legs with an intermediate separation. The intermediate separation is larger than the external housing width of a labeling aggregate 8 in this area.

Figure 2:
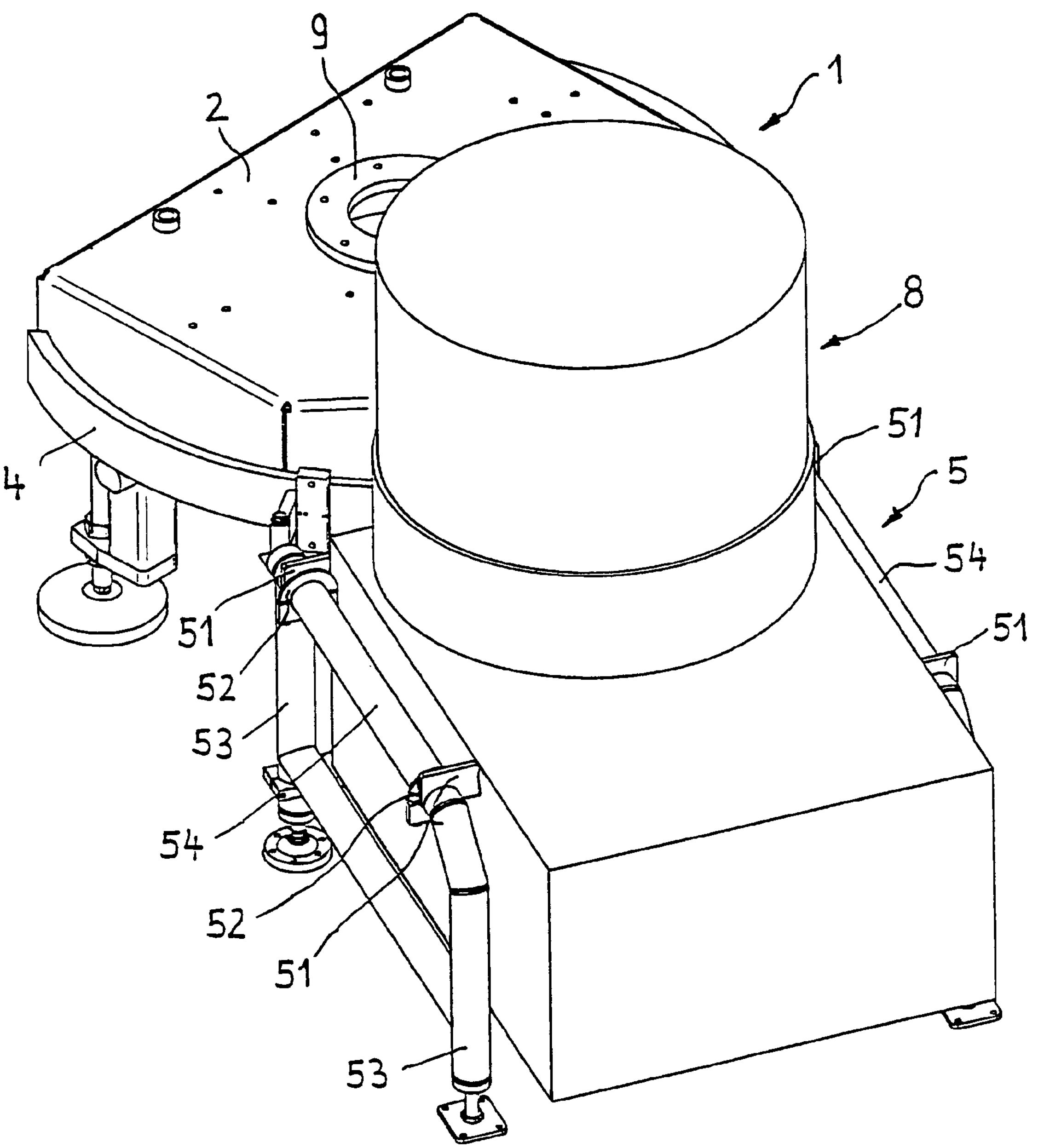
FIG. 2 shows the design according to FIG. 1 with the labeling aggregate—shown only schematically—which is inserted in the aggregate reception.

On at least one of the support rods 54, which are oriented radially toward the ring 4, two clampable second elements 52 are located, with a design which in part fixes the position of a labeling aggregate in collaboration with the first elements 51, visible in FIG. 2, which are attached to the aggregate housing.

These first elements 51, whose shape is scythe-like, are attached laterally to the housing of the labeling aggregate 8, in a projecting position so that, during the insertion or lowering of a labeling aggregate from above onto the support rods 54, they are applied laterally against the second elements 52. Because of the rounding of the side of the first elements 51, which is adapted to the pipe cross section and which is directed toward the support rods 54, the connection is a positive lock, which fixes, in a manner which allows no resetting, the operating position of the labeling aggregate 8 both longitudinally and transversely to the support rods 54. In the process, the aggregate reception 5 transfers the entire weight of the labeling aggregate directly to the floor.

To facilitate the automatic, gravity-supported introduction and centering of the labeling aggregates, the second elements are provided with an introduction slope 52', at least in their area which points upward. To insert or remove a labeling aggregate, an integrated or external lifting device (lifting truck, lifting tool, etc.) is required.

The aggregate reception 5, when the machine 1 is set up, is oriented once and for all in the exact working position (height, radial separation, slope of the transport plane) of a labeling aggregate. After that, any desired labeling aggregates can be used, because the first elements 51 are all attached in exactly the same position to each aggregate housing.

Figure 3:
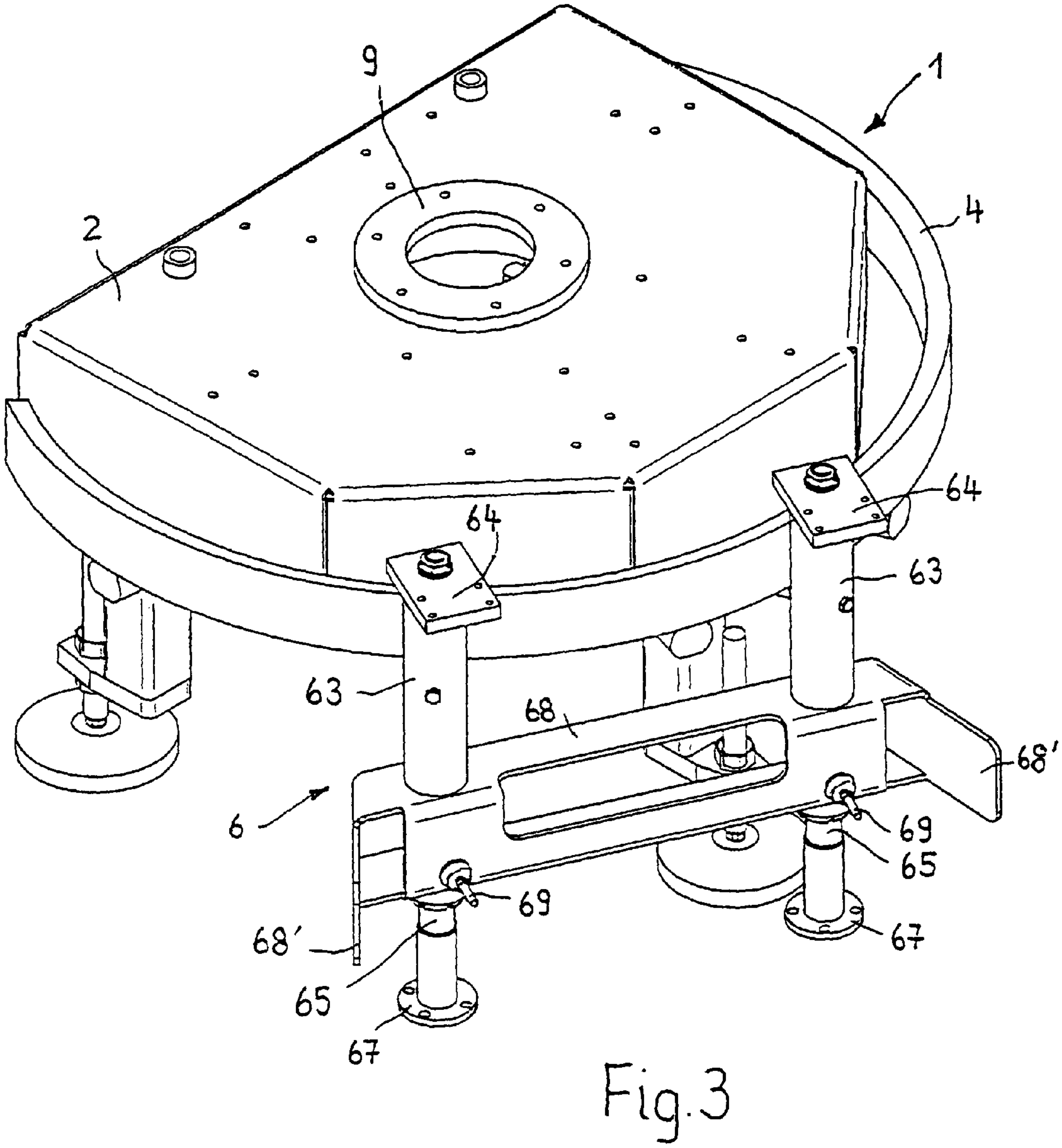
FIG. 3 shows a perspective representation of a second embodiment of an aggregate reception for labeling aggregates.
Figure 4:
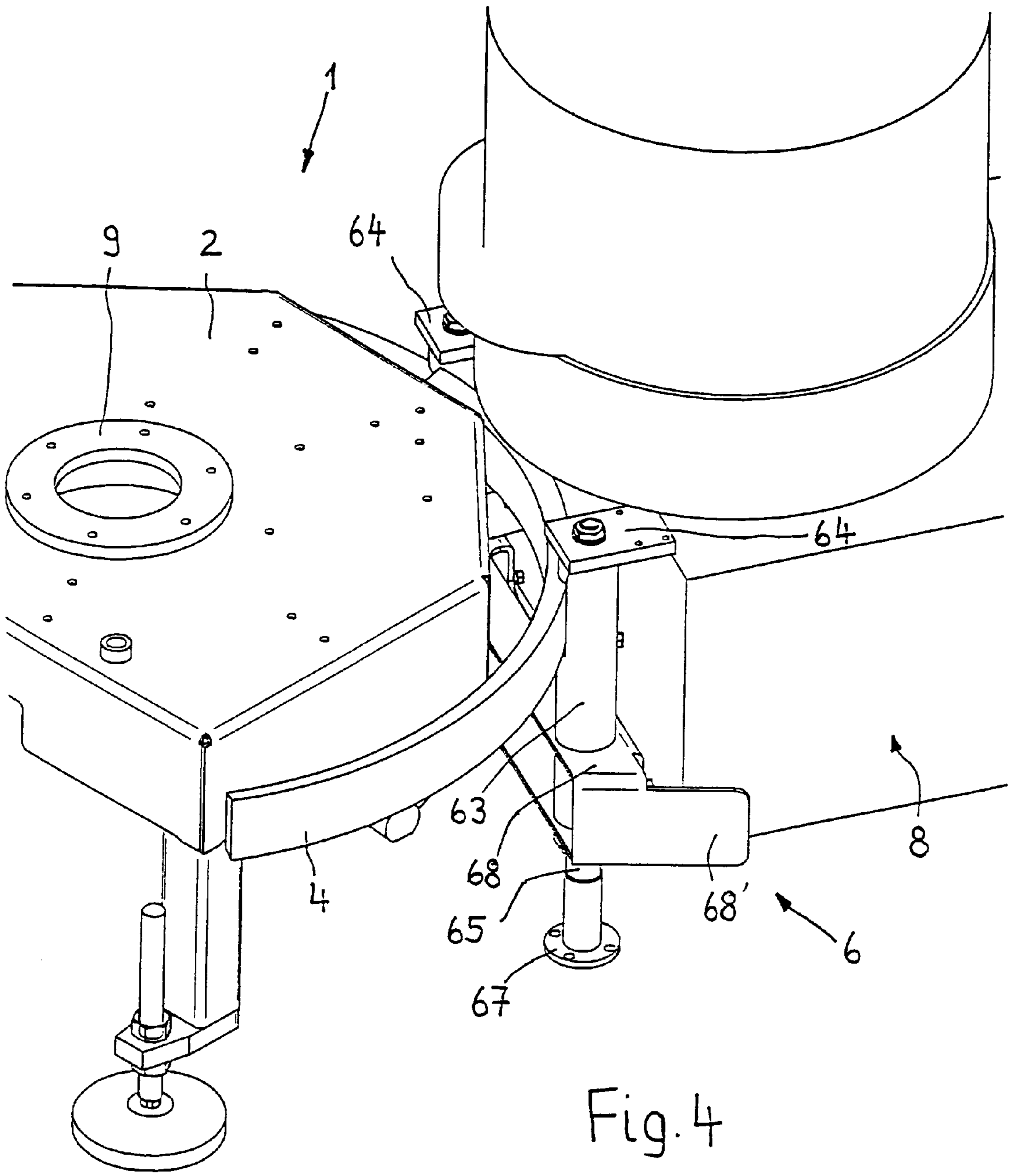
FIG. 4 shows a side view of the second embodiment of an aggregate reception according to FIG. 3 with an inserted labeling aggregate, shown only schematically.
Figure 5:
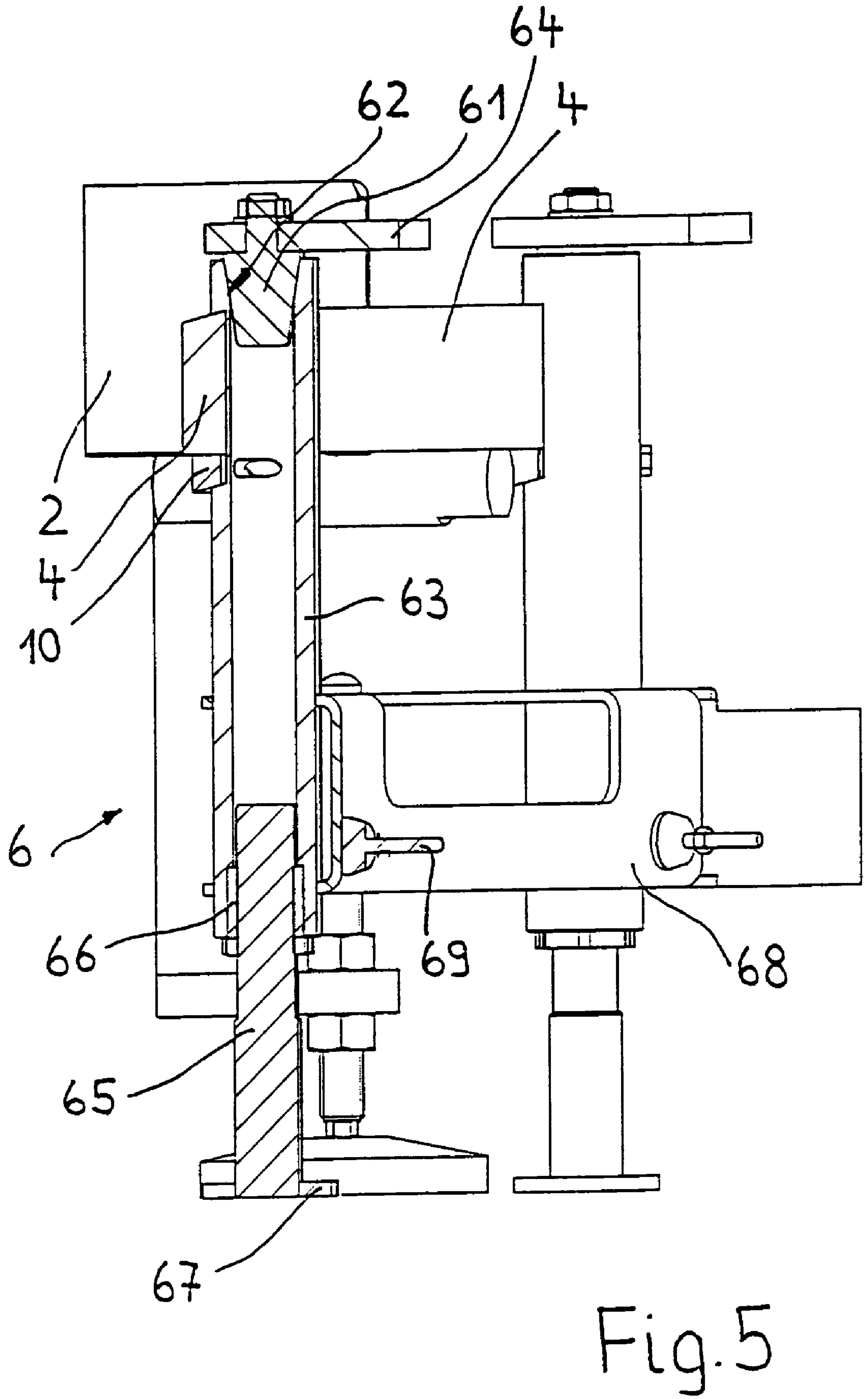
FIG. 5 shows a vertical partial cross section through the aggregate reception of FIGS. 3 and 4.

This also applies advantageously to the second embodiment of a floor-supported aggregate reception 6, which is shown in FIGS. 3 and 4. In principle, this construction represents a slimmed down variant of the first embodiment and it has only two support legs 63, which are also attached to the ring 4—preferably with positive lock. Both support legs 63 are designed as hollow pipes with circular cross section. At each lower end, a threaded bushing 66 is pressed in. Through the latter a threaded spindle 65 penetrates (see cross-sectional representation in FIG. 5). It is used to adjust the height of feet 67 which are attached to the floor in a manner so they cannot be shifted, for example, with screws. At the top open end of each hollow pipe, a conically designed seat 62 is attached for the reception with positive lock of a centering cone 61, which is attached to the labeling aggregate or a plate-shaped extension 64 which is attached to it.

Both hollow pipes are connected in the area close to the floor by a horizontal transverse strut 68. To the cross strut, at least one horizontal, preferably continuously adjustable, abutment 69 (setting screw or similar part) is attached to fix an inclination of a labeling aggregate, against which the aggregate housing is applied. The abutment 69, of which there is at least one, conversely can also be attached to the aggregate housing and be supported on the transverse strut 68.

The two mentioned centering cones 61 are screwed to the bottom side of two extension plates 64 which each project laterally from the labeling aggregate, namely at the same height with equivalent separations from the hollow pipe 63.

On the lateral ends of the horizontal transverse strut 68, which extend above the hollow pipes 63, transverse guidance introduction surfaces 68' are provided, which have the result that, when a slightly lifted labeling aggregate 8 is inserted in the radial direction toward the ring 4, the automatic lateral, that is tangential, adjustments in orientation are made, until the movement of introduction is stopped by contact with abutments 69, of which there is at least one. In this situation, the centering cones 61, which point downward, are in alignment, at least approximately, with a conical seat 62 located below in the hollow pipe 63. As a result of the lowering, the centering cones form a positive-lock engagement with their seat surfaces, resulting in a very precise fine centering. As a result of the gravitational weight of the label aggregate, its operating position (see FIG. 4) is fixed. The height position of the centering cones can be optionally adjusted by their threaded screw connection on the extension 64.

Figure 6:
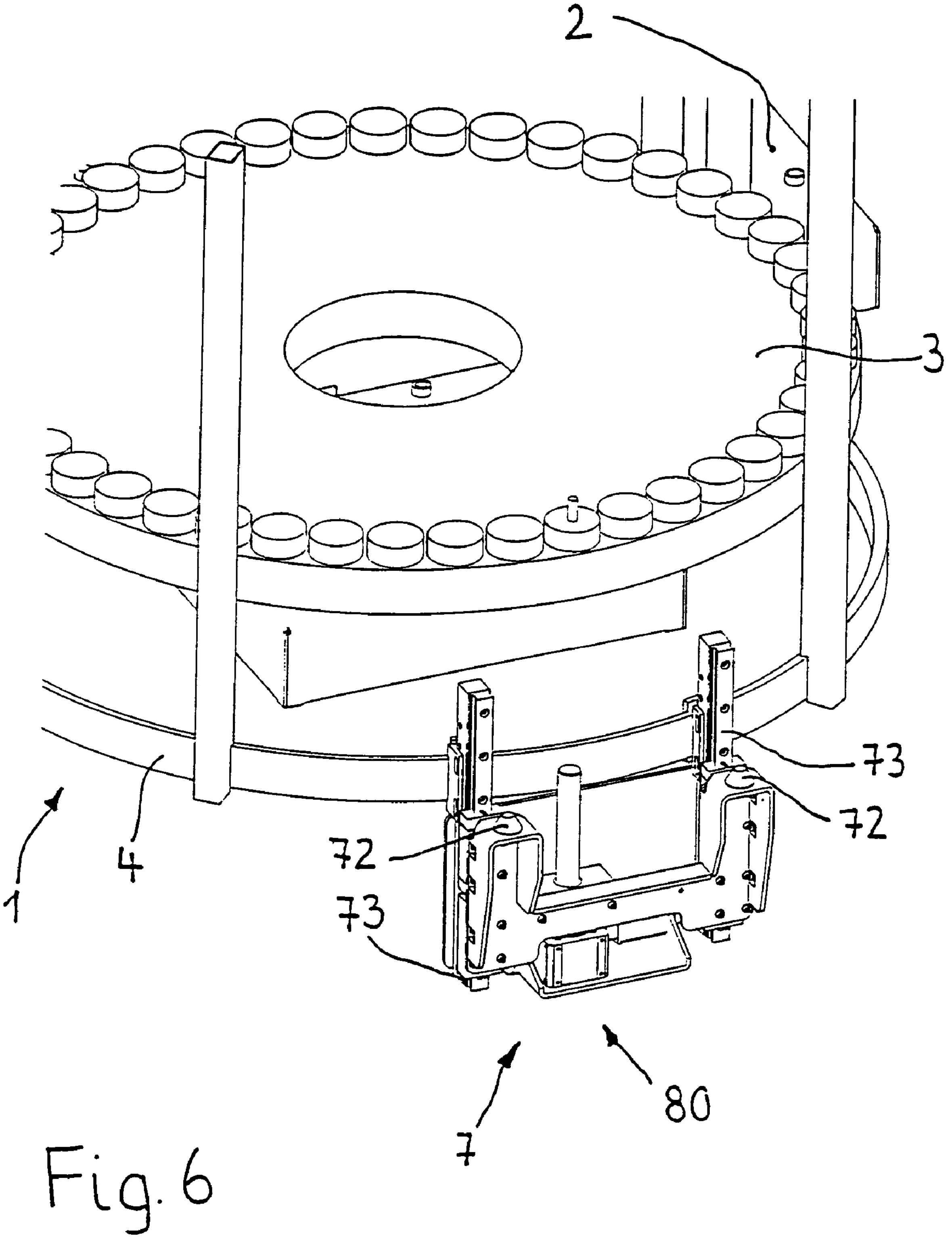
FIG. 6 is a perspective representation of an aggregate reception according to a third embodiment example with a lifting direction.
Figure 7:
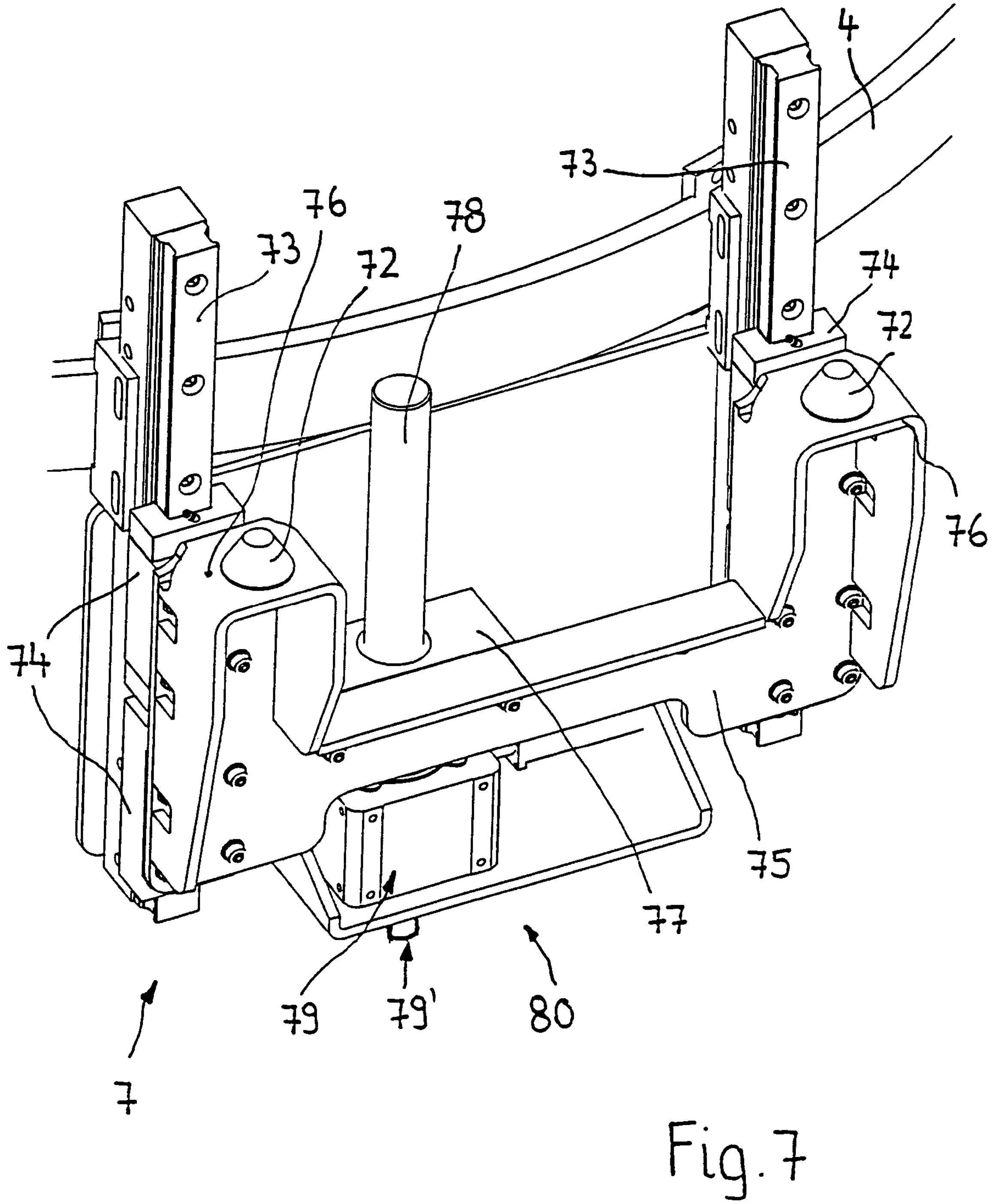
FIG. 7 is a cross section of FIG. 6 in an enlarged representation.

A third embodiment example of an aggregate reception 7 constitutes the object of FIGS. 6 and 7. Compared to the above described second embodiment example, the main difference consists of an integrated lifting device 80, which allows a lifting of a labeling aggregate in different operational positions to set different label adhesion heights. As a result, one can, without using a substitute, omit the height adjustment which in the past had to be used in the labeling aggregate.

This third embodiment 7 presents two vertical parallel ball guides 73 which are attached to the ring 4 and to the floor, and whose movable slide 74 is connected rigidly by a cross bar 75 which is formed from a thick-walled profiled metal part. On each of the two external side edges of the cross bar 75, a support arm 76 is formed, which presents a centering cone 72 on its topside. The latter can be brought in a positive-lock engagement, for orienting and centering the labeling aggregate during the lifting from a low lying standby position, with recessed conical seat surfaces (not shown) and identical separation on the projecting bottom side of the labeling aggregate.

To move the cross bar 75 up and down, an electromotor driven lift drive is provided, which, in detail, consists of a drive motor 79, which is fixed to the frame, with a vertically oriented threaded spindle 78, which passes through a threaded bore in a block 77 which is rigidly attached to the cross bar 75.

The upper operational position can be fixed by presettable abutments or end switches, which are not shown, and which can be moved into the travel path. However, in connection with a program memory, there is the possibility of calling, via a position query, different operational positions by pressing a button and to achieve the automatic setting by motor. For this purpose, a rotation setting giver 79' can be provided on the drive motor. The only requirement is that a corresponding value must be stored in the program memory for each desired label adhesion height.

With this solution, an exchange of movable labeling aggregates can be carried out particularly rapidly and in an extremely convenient manner without any aids. Naturally, the guide introduction surfaces, which are not shown, can also be provided according to the second embodiment example for the prealignment of a new labeling aggregate to be inserted.

If the holder is sufficiently stable, one can omit the floor support of the vertical guides 73, if a dimensionally stable reception of the torque, which is caused by the aggregate weight and the one-sided holder, is ensured.

In FIG. 7, the carousel 3 of the labeling machine 1 can be seen in a schematic representation. It can be equipped with a multitude of rotating disks, which are arranged at equal intervals on a common partial circle, to receive the article to be labeled, such as, bottles or similar items.

FIG. 8 shows a fourth embodiment example of an aggregate reception bearing the reference numeral 40. It is characterized by a flat low support construction, that is a labeling aggregate, which is not shown, can be deposited with its bottom side on the plate-like shaped aggregate reception, and it can be held in an orientation which is centered with respect to the carousel 3. For this purpose, several centering elements 43 are arranged with offset on a horizontal plate 41, each presenting a centering cone 45 and a support surface 44. The plate 41 stands on four feet 42. The feet 42 and/or the centering elements 43 can be adjusted to an exact height by means of threaded attachments, to hold the labeling aggregates in the desired orientation. As a rule, this setting needs to be done only once. On the bottom side of a labeling aggregate or its support frame, centering bores are located, which are arranged in alignment with the centering elements 43. By means of a connection element 10', the plate 41 is connected with the ring 4 which is attached to the frame 2.

According to the bottom part of FIG. 8, the plate 41 can be coupled advantageously via a swivel joint 46 to the connection element 10' about a horizontal axis, in a manner so it can be flipped open and shut, so that the aggregate reception 40, when it is not used, can be flipped using a handle 49 (FIG. 9) from an operational position (top representation of FIG. 8) by 90° upwards into an non operational position (bottom part of FIG. 8). By this measure, a good accessability to the machine is guaranteed.

To simplify the introduction of a labeling aggregate, according to FIG. 9, introduction slopes are attached to the top side of the plate 41, in the form of raised ledges 48, which are oriented radially from outside toward an abutment 47 which determines the radially internal end position. Their mutual separating distance decreases in the direction of introduction, resulting in the possibility of a lateral preorientation of a labeling aggregate which can be moved on wheels, in connection with guide rollers (not shown), which are attached to its bottom side and which can be rolled between the ledges 48. As soon as a guide roller which moves in advance in the direction of introduction hits the abutment 47, the movement of introduction of the labeling aggregate is stopped, and its bottom side centering bores are in approximate alignment with the centering elements 43 of the aggregate reception 40 located below. By lowering the aggregate, the mentioned centering elements come to form a positive-lock engagement, until the aggregate sits on the support surfaces 44 and, thereby, is finely centered in the desired position. The removal of an aggregate occurs in reversed order. The labeling aggregate or its support frame can have an integrated lifting device (for example, one which can be actuated hydraulically or electrically) for lifting and lowering.

In a manner which has not been represented, the aggregate reception 40 can also be designed to allow for height adjustment, to be able to bring different labeling aggregates into different working positions (different adhesion heights of the labels on the vessels). For this purpose, one can use a motor-driven lifting device, similar to that of the embodiment example in FIGS. 6 and 7, which can lift or lower the plate 41.

We claim:

1. Machine for equipping articles with labels, such as vessels or similar items, comprising:
- a rotatable carousel which transports the articles;
- a rigid frame supporting the rotatable carousel;
- a drive motor, wherein the drive motor rotates a vertical spindle;
- an aggregate reception, the aggregate reception comprising:
  - a vertically disposed guide secured to the frame;
  - a rigid cross bar slidably coupled to guide, the cross bar engaging the spindle such that when the drive motor rotates in a first direction, the cross bar is upwardly displaced relative to the drive motor, and when the drive motor rotates in a second direction, the cross bar is downwardly displaced relative to the drive motor; and
  - at least one first element disposed on a top surface of the cross bar; and
- an exchangeable labeling aggregate for equipping the articles with labels as the articles are transported by the carousel, the labeling aggregate having at least one second element that matingly engages with the at least one first element disposed on the top surface of the cross bar to center and fix the position of the labeling aggregate relative to the periphery of the carousel,
- wherein the upward and downward displacement of the cross bar by the drive motor allows the labeling aggregate to be lifted into different operational positions to set different label adhesion heights.

2. Machine according to claim 1, wherein the guide is secured to a floor surface.

3. Machine according to claim 1, wherein the respective first and second elements on the labeling aggregate and the aggregate reception present a complementary design.

4. Machine according to claim 3, wherein the respective first and second elements are designed in pairs which engage with each other.

5. Machine according to claim 1, wherein the cross-bar can be moved out of a reception position for the respective insertion of the labeling aggregate into an operating position, which is at a greater height than the insertion position, for the labeling aggregate, and vice versa.

6. Machine according to claim 5, wherein each operating position is preadjustable for different label adhesion heights by one of preadjustable abutments or switches which are brought into a travel path of the cross-bar, or by preset values which are stored in a drive control of the drive motor and which are called.

7. Machine according to claim 1, wherein the aggregate reception is brought in engagement with a bottom side of a labeling aggregate.

8. Machine according to claim 1, wherein the at least one first element is a centering bore and the at least one second element is a centering cone.

9. Machine according to claim 1, wherein the drive motor includes a speed sensor and is controlled by a control that can be programmed in memory.

10. Machine according to claim 1, wherein the at least one first element is a centering cone and the at least one second element is a centering bore.

11. Machine according to claim 1, wherein the cross bar has a threaded bore that threadedly engages the spindle such that when the drive motor rotates in a first direction, the cross bar is upwardly displaced relative to the drive motor, and when the drive motor rotates in a second direction, the cross bar is downwardly displaced relative to the drive motor.

12. Machine according to claim 11, wherein the threaded bore of the cross bar is formed in a block that is secured to the cross bar.

13. Machine according to claim 1, wherein the guide has a movable slide that is vertically displaceable relative to the guide, and wherein the cross bar is secured to the movable slide.

14. Machine according to claim 1, wherein the cross bar includes a pair of vertically-projecting support arms, and wherein the at least one first element is disposed on a top surface of one of the support arms.

15. Machine according to claim 1, wherein a generally planar guidance introduction surface is coupled to one of the guide, the cross bar, and the frame such that when the labeling aggregate is moved towards the frame, the guidance introduction surface channels the labeling aggregate into a position in which the second element of the labeling aggregate is generally aligned with the first element of the cross bar.

16. Machine according to claim 1, further comprising a vertically disposed second guide secured to the frame, wherein the second guide is parallel to and offset from the guide.

17. Machine for equipping articles with labels, such as vessels or similar items, comprising:

a rotatable carousel which transports the articles;

a rigid frame supporting the rotatable carousel;

an aggregate reception, the aggregate reception comprising:

a substantially planar plate pivotably coupled to the frame;

at least one first element disposed on a top surface of the plate; and at least one foot disposed on a bottom surface of the plate, wherein the plate can be pivoted from an operational position into a non-operational position, wherein in the operational position, the plate is substantially parallel to a floor surface and the at least one foot contacts the floor surface to support the plate, and in the non-operational position, the plate is substantially perpendicular to the floor surface; and an exchangeable labeling aggregate for equipping the articles with labels as the articles are transported by the carousel, the labeling aggregate having at least one second element that matingly engages with the at least one first element disposed on the top surface of the plate when the plate is in the operational position to center and fix the position of the labeling aggregate relative to the periphery of the carousel, wherein the plate has a pair of raised ledges vertically projecting from the top side of the plate and extending in a general direction of introduction of the labeling aggregate relative to the plate, the raised ledges engaging with corresponding guide rollers coupled to a bottom surface of the labeling aggregate during the introduction of the labeling aggregate, thereby allowing the labeling aggregate to be rolled into a position in which the at least one first element is in alignment with the at least one second element.

18. Machine according to claim 17, wherein a distance separating each of the pair of raised ledges decreases in the direction of introduction.

19. Machine according to claim 17, wherein the plate has a tangentially disposed raised abutment vertically projecting from the top side of the plate, the abutment preventing further longitudinal displacement of the labeling aggregate when the labeling aggregate is being rolled into the position in which the at least one first element is in alignment with the at least one second element.

20. Machine according to claim 17, wherein the at least one first element is a centering cone and the at least one second element is a centering bore.

21. Machine according to claim 17, wherein the at least one first element is a centering bore and the at least one second element is a centering cone.

22. Machine according to claim 17, wherein the at least one foot is threadedly coupled to a portion of the bottom surface of the plate, the at least one foot thereby being vertically adjustable such that the vertical distance between the floor surface and the bottom surface of the plate can be varied.

23. Machine according to claim 20, wherein the centering cone is threadedly coupled a portion of the top surface of the plate such that the centering cone is vertically adjustable relative to the plate.

24. Machine according to claim 17, wherein the at least one second element is disposed on a bottom side of the labeling aggregate.

25. Machine according to claim 17, wherein a connection element is coupled to the frame, and a swivel joint couples the connection element to the plate, the swivel joint allowing the plate to pivot at least 90° relative to the floor surface.

* * * * *